(12) United States Patent
Morton-Aslanis et al.

(10) Patent No.: US 12,498,338 B2
(45) Date of Patent: Dec. 16, 2025

(54) ARTICULATION SYSTEM FOR A FLASH FIRE MANIKIN

(71) Applicant: North Carolina State University, Raleigh, NC (US)

(72) Inventors: John Morton-Aslanis, Raleigh, NC (US); Roger L Barker, Raleigh, NC (US); A. Shawn Deaton, Raleigh, NC (US); Hai Bui, Raleigh, NC (US); Mark Martin, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 400 days.

(21) Appl. No.: 18/223,130

(22) Filed: Jul. 18, 2023

(65) Prior Publication Data

US 2024/0035993 A1    Feb. 1, 2024

Related U.S. Application Data

(60) Provisional application No. 63/369,570, filed on Jul. 27, 2022.

(51) Int. Cl.
| | |
|---|---|
| *G09B 23/16* | (2006.01) |
| *A41D 31/08* | (2019.01) |
| *A62B 17/00* | (2006.01) |
| *G01N 25/00* | (2006.01) |
| *G09B 23/30* | (2006.01) |

(52) U.S. Cl.
CPC ........... *G01N 25/005* (2013.01); *A41D 31/08* (2019.02); *A62B 17/003* (2013.01); *G09B 23/16* (2013.01); *G09B 23/30* (2013.01)

(58) Field of Classification Search
CPC ................................. G09B 23/16; G09B 23/30
See application file for complete search history.

(56) References Cited

FOREIGN PATENT DOCUMENTS

| CN | 103616409 A | * | 3/2014 |
|---|---|---|---|
| CN | 207832427 U | * | 9/2018 |
| CN | 220120751 U | * | 12/2023 |

OTHER PUBLICATIONS

Sipe, Joel E. "Development of an Instrumented Dynamic Mannequin Test to Rate the Thermal Protection Provided by Protective Clothing". 2004. Worcester Polytechnic Institute. Master Thesis (Year: 2004).*

Richards, Mark. "A Sweating Agile Thermal Manikin (SAM) Developed to Test Complete Clothing Systems Under Normal and Extreme Conditions". RTO HFM Symposium on Blowing Hot and Cold: Protecting Against Climatic Extremes, Dresden, Germany, Oct. 8-10, 2001. (Published in RTO-MP-076). (Year: 2001).*

* cited by examiner

*Primary Examiner* — Robert J Utama
(74) *Attorney, Agent, or Firm* — NK Patent Law

(57) ABSTRACT

A flash fire instrumented manikin articulation system designed to evaluate the thermal protective performance of protective clothing when exposed to flames. The flash fire instrumented manikin articulation system includes an instrumented manikin and an articulation system designed to simulate exposure to a flash fire and simulate dynamic movement including walking and jogging.

20 Claims, 16 Drawing Sheets

402

ARTICULATION SYSTEM FOR A FLASH FIRE MANIKIN

CROSS-REFERENCE TO RELATED APPLICATIONS

The present application claims the benefit of U.S. Provisional Patent Application No. 63/369,570, filed Jul. 27, 2022, the entire content of which is incorporated by reference herein in its entirety.

GOVERNMENT SUPPORT

This invention was made with government support under grant number EMW-2018-FP-00401 awarded by the U.S. Department of Homeland Security—Federal Emergency Management Agency (DHS/FEMA). The government has certain rights in the invention.

TECHNICAL FIELD

The present invention is related generally to the field of thermal properties testing for clothing. More particularly, the present invention is related to methods and systems for testing the thermal protective performance of clothing during and after exposure to flames.

BACKGROUND

The American Society for Testing and Materials (ASTM) F1930 Test is the standard for evaluation of flame-resistant clothing for protection against fire simulations using an instrumented manikin. The ASTM F1930 Test is used to predict human skin burn injury for single-layer garments or protective clothing mounted on a stationary upright instrumented manikin which is then exposed in a laboratory to a simulated fire environment having controlled heat flux, flame distribution, and duration.

Current methods and systems of testing the thermal protective performance of clothing include an analysis of a flash fire on a stationary manikin. Using a stationary manikin prevents current systems from providing an accurate evaluation of the performance of the clothing in a realistic situation that involves the running action that often occurs when escaping from the flames of a flash fire. A stationary manikin fails to test the physical integrity or durability of the clothing when subjected to the mechanical stresses produced by the movement of the arms and legs in combination with applied flames. Therefore, there is a need for an articulated dynamic flash fire manikin system that simulates realistic dynamic movement while in a flash-fire escape scenario.

SUMMARY

Accordingly, described herein are methods and systems for testing the thermal protective performance of clothing using a dynamic manikin exposed to a flash fire.

This summary is provided to introduce simplified form concepts that are further described in the following detailed descriptions. This summary is not intended to identify key features or essential features of the claimed subject matter, nor is it to be construed as limiting the scope of the claimed subject matter.

This invention relates to a laboratory testing system for evaluating the thermal protective performance of protective clothing worn by an instrumented manikin executing dynamic movements (e.g., simulating walking or running) while simultaneously exposed to flames simulating the intensity of a flash fire. Static system-level fire manikin tests have provided limited simulations of the effects of fire exposure on protective gear in the dynamic conditions involved in emergency fire environments. The present invention incorporates an instrumented manikin platform and protocols that enable the testing of the thermal protection properties of a garment while undergoing dynamic motion during flash fire exposure. The dynamic motion enables the realistic assessment of thermal protection of full-scale thermally protective gear used by firefighters, industrial fire protective garments, and many other applications.

In some embodiments, the present invention includes a dynamic motion instrumented manikin system for flash fire testing including an instrumented manikin comprising a heat-resistant material and a plurality of limbs, an articulation system comprising a plurality of articulation components, at least one electric motor, and at least one controller, at least one flame generation component at least one sensor, and at least one data acquisition component. The articulation system, the at least one flame generation component, the at least one sensor, and the at least one data acquisition component are in network communication. The articulation system is connected to the instrumented manikin via the plurality of articulation components, and the at least one electric motor is designed to drive the plurality of articulation components to move the instrumented manikin to simulate at least one dynamic motion including walking or running.

In some embodiments, the present invention includes a dynamic motion flash fire instrumented manikin test system for simulation of a flash fire including an instrumented manikin comprising a heat-resistant material and a plurality of limbs, an articulation system comprising a plurality of articulating rods, at least one electric motor, and at least one controller, at least one flame generation component designed to generate a flash fire, at least one data acquisition component, and at least one sensor. The dynamic motion flash fire instrumented manikin test system further includes an instrumented manikin operable to simulate dynamic movement including a pumping action of walking or running. The plurality of limbs is connected to the articulation system via the plurality of articulating rods. The at least one electric motor is operable to drive the plurality of articulating rods to simulate the dynamic movement. The at least one controller is operable to move the plurality of limbs for a predetermined time period, the predetermined time period including a time before activation of the at least one flame generation component, a time during activation of the at least one flame generation component, and a time after activation of the at least one flame generation component. The at least one sensor is operable to capture heat data including temperature, heat flux, and heat distribution generated by the at least one flame generation component. The heat data further includes temperature, heat flux, and heat distribution near the instrumented manikin, and temperature, heat flux, and heat distribution on an external surface of the instrumented manikin. The at least one sensor is in network communication with the at least one data acquisition component. The at least one data acquisition component is designed to receive the heat data from the at least one sensor and to determine at least one effect of the heat generated by the at least one flame generation component on the instrumented manikin.

In some embodiments, the present invention includes a method of performing flash fire testing on an instrumented manikin system, the method includes selecting a testing standard including a heat flux requirement, a flame distribution requirement, and a flame duration requirement. Next, the method includes positioning, via an articulation system, at least one limb of a plurality of limbs of an instrumented manikin based on the selected testing standard. The articulation system comprises a plurality of articulation components, at least one electric motor, and at least one controller. The method further includes activating at least one flame generation component based on the selected testing standard, and then moving, via the articulation system, the instrumented manikin in a dynamic motion for at least the flame duration requirement. The dynamic motion includes walking or running. After, the method includes collecting, via at least one sensor, heat data corresponding to the at least one flame generation component and the instrumented manikin. The heat data includes temperature and heat flux. Then, the method further includes deactivating the at least one flame generation component based on the selected testing standard, collecting, via the at least one sensor, heat data corresponding to an external surface of the instrumented manikin after the deactivation of the at least one flame generation component, and determining, via at least one data acquisition component, a burn level based on the heat data after the activation of the at least one flame generation component and the heat data after the deactivation of the at least one flame generation component. The burn level includes a first-degree burn, a second-degree burn, and/or a third-degree burn.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Figure 1:
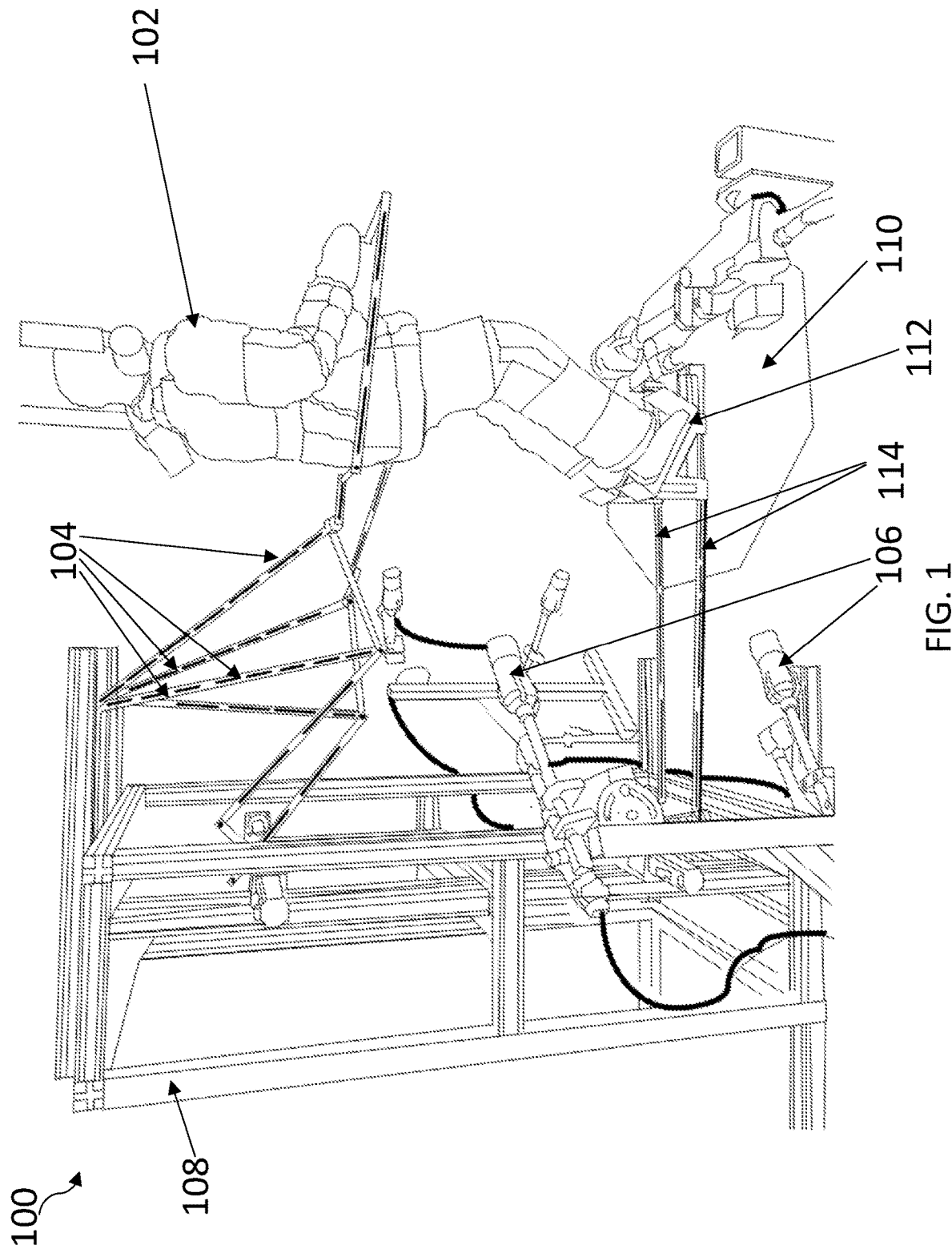
FIG. 1 illustrates a side perspective view of a flash fire instrumented manikin system according to one embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terminology used herein is for the purpose of describing particular embodiments only and is not intended to be limiting. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The present invention is designed to predict human skin burn injury for single or multi-layer layer garments or protective clothing mounted on a dynamic instrumented manikin. The instrumented manikin is exposed in a laboratory to a simulated fire environment having controlled heat flux, flame distribution, and duration. In one embodiment, the average heat flux is 84 kW/m$^2$ (2 cal/s·cm$^2$) and has a duration of up to twenty seconds. The visual and physical changes to the single-layer garment or protective clothing are captured to determine the overall performance of the garment or protective clothing. The present invention is used to measure and describe the response of materials, products, or assemblies to heat and flame under controlled conditions.

The components of the instrumented manikin are designed to work together automatically with an articulation system and a flame generation component (e.g., propane ignition system) to provide the ability for dynamic movement to occur before, during, and/or after the propagation of flames at specified accelerations, speeds, and durations.

Static system-level fire manikin tests provide a limited simulation of the effects of fire exposure on protective gear in the dynamic conditions involved in emergency fire environments. The present invention incorporates a system-level manikin test platform and protocols that enable the testing of thermal protection involving dynamic motion during flash fire exposure. Dynamic motion enables unprecedented thermal protection assessment of full-scale thermally protective ensembles and gear used by firefighters, industrial fire protective garments, and many other applications. The present invention further enables the assessment of the effects of simultaneous fire exposure and mechanical stress on the thermal and physical integrity of materials used in the construction of fire-protective clothing. The assessment includes evaluation of the (1) effects of air movement inside the protective suit resulting from the air pumping action of simulated arm and leg movements on thermal protective performance and (2) effects of dynamic walking or running actions on the infiltration of dangerous levels of heat from flames exposures into the interior of the suit through clothing interfaces. Advantageously, the present invention is designed to assess the flame thermal protection at the wrist, ankle, and neck areas of the heat-protective clothing system.

In some embodiments, the present invention includes a dynamic motion instrumented manikin system for flash fire testing including an instrumented manikin comprising a heat-resistant material and a plurality of limbs, an articulation system comprising a plurality of articulation components, at least one electric motor, and at least one controller, at least one flame generation component at least one sensor, and at least one data acquisition component. The articulation system, the at least one flame generation component, the at least one sensor, and the at least one data acquisition component are in network communication. The articulation system is connected to the instrumented manikin via the plurality of articulation components, and the at least one electric motor is designed to drive the plurality of articulation components to move the instrumented manikin to simulate at least one dynamic motion including walking or running.

In some embodiments, the dynamic motion flash fire instrumented manikin test system includes a plurality of limbs including at least one joint and at least one articulation component of the plurality of articulation components connected to the at least one joint. In some embodiments, the at least one controller is operable to control the at least one electric motor and the plurality of articulation components. The at least one controller is further operable to control a position of the plurality of limbs for a predetermined time period using the at least one electric motor and the plurality of articulation components. The predetermined time period includes a time before activation of the at least one flame generation component, a time during activation of the at least one flame generation component, and a time after activation of the at least one flame generation component. In some embodiments, each limb of the plurality of limbs is separately controllable via the at least one controller. In some embodiments, the at least one flame generation component further includes at least one propane component. The at least one flame generation component is further operable to control a flame intensity and a spatial distribution of heat flux engulfing the instrumented manikin. In some embodiments, the at least one flame generation component is operable to control a flame intensity and spatial distribution of heat flux for at least ten seconds. In some embodiments, the at least one flame generation component includes at least eight propane components and is configured to generate a flash fire with an average heat flux of about 84 kw/m$^2$. In some embodiments, the plurality of articulation components is attached to the instrumented manikin via a plurality of angle iron mounts. In some embodiments, the at least one sensor is attached to the instrumented manikin. The at least one sensor is operable to capture temperature data corresponding to the heat generated by the at least one flame generation component. In some embodiments, the at least one flame generation component is designed to simulate a flash fire. The at least one sensor further includes a plurality of sensors including at least one temperature sensor designed to capture temperature data related to the heat generated by the at least one flame generation component. The plurality of sensors further includes at least one other sensor including a movement sensor. The movement sensor is designed to monitor a movement of the instrumented manikin while undergoing the flash fire. In some embodiments, the movement sensor includes an accelerometer or an inertial measurement unit. The movement sensor is operable to monitor a position and a change of position of the instrumented manikin. In some embodiments, at least one sensor is operable to transmit the temperature data to the at least one data acquisition component. The at least one data acquisition component is operable to determine a temperature and heat flux experienced by the instrumented manikin. In some embodiments, the at least one data acquisition component is further operable to determine at least one injury based on the temperature and heat flux experienced by the instrumented manikin. The at least one injury includes a first-degree burn, a second-degree burn, and/or a third-degree burn. The at least one data acquisition component further determines a percentage of body burned. In some embodiments, the data acquisition component includes a predicted skin burn model to determine a temperature value at an external surface of the instrumented manikin, the predicted skin burn model further estimates the temperature value at an epidermis level and/or an subcutaneous level. In some embodiments, the at least one sensor is operable to measure heat flux from about zero to about 164 kW/m$^2$.

In some embodiments, the present invention includes a dynamic motion flash fire instrumented manikin test system for simulation of a flash fire including an instrumented manikin comprising a heat-resistant material and a plurality of limbs, an articulation system comprising a plurality of articulating rods, at least one electric motor, and at least one controller, at least one flame generation component designed to generate a flash fire, at least one data acquisition component, and at least one sensor. The dynamic motion flash fire instrumented manikin test system further includes an instrumented manikin operable to simulate dynamic movement including a pumping action of walking or running. The plurality of limbs is connected to the articulation system via the plurality of articulating rods. The at least one electric motor is operable to drive the plurality of articulating rods to simulate the dynamic movement. The at least one controller is operable to move the plurality of limbs for a predetermined time period, the predetermined time period including a time before activation of the at least one flame generation component, a time during activation of the at least one flame generation component, and a time after activation of the at least one flame generation component. The at least one sensor is operable to capture heat data including temperature, heat flux, and heat distribution generated by the at least one flame generation component. The heat data further includes temperature, heat flux, and heat distribution near the instrumented manikin, and temperature, heat flux, and heat distribution on an external surface of the instrumented manikin. The at least one sensor is in network communication with the at least one data acquisition component. The at least one data acquisition component is designed to receive the heat data from the at least one sensor and to determine at least one effect of the heat generated by the at least one flame generation component on the instrumented manikin.

In some embodiments, the at least one flame generation component is operable to control a flame intensity and spatial distribution of heat flux around the instrumented manikin. In some embodiments, the at least one sensor includes a thermal energy sensor. The thermal energy sensor measures heat flux between about zero to about 164 kW/m$^2$. In some embodiments, the at least one flame generation component includes at least eight propane components.

In some embodiments, the present invention includes a method of performing flash fire testing on an instrumented manikin system, the method includes selecting a testing standard including a heat flux requirement, a flame distribution requirement, and a flame duration requirement. Next, the method includes positioning, via an articulation system, at least one limb of a plurality of limbs of an instrumented manikin based on the selected testing standard. The articulation system comprises a plurality of articulation components, at least one electric motor, and at least one controller. The method further includes activating at least one flame generation component based on the selected testing standard, and then moving, via the articulation system, the instrumented manikin in a dynamic motion for at least the flame duration requirement. The dynamic motion includes walking or running After, the method includes collecting, via at least one sensor, heat data corresponding to the at least one flame generation component and the instrumented manikin. The heat data includes temperature and heat flux. Then, the method further includes deactivating the at least one flame generation component based on the selected testing standard, collecting, via the at least one sensor, heat data corresponding to an external surface of the instrumented manikin after the deactivation of the at least one flame generation component, and determining, via at least one data acquisition component, a burn level based on the heat data after the activation of the at least one flame generation component and the heat data after the deactivation of the at least one flame generation component. The burn level includes a first-degree burn, a second-degree burn, and/or a third-degree burn.

In one embodiment, as shown in FIG. 1, the present invention includes a flash fire instrumented manikin test system 100 including an instrumented manikin 102, an articulation system including a plurality of articulation components 104, a flame generation system comprising a plurality of flame generation components 106, a support frame 108, a support platform 110, a data acquisition component, and at least one sensor.

The instrumented manikin 102 is attached to the support frame 108 via the articulation system. For example, and not limitation, at least one articulation component 104 of the articulation system is attached to a hand and/or arm of the instrumented manikin 102. The instrumented manikin is further attached to the support platform 110. For example, and not limitation, each foot of the instrumented manikin is attached to a foot platform 112 connected to a guiding rail 114 positioned on the support platform 110. The support platform 110 is attached to the support frame 108 via at least two articulation components of the articulation system. For example, and not limitation, the articulation components include a rod linkage system comprising a plurality of couplers and rods that provide flexibility. The articulation system is designed to move the arms, hands, legs, and/or feet of the instrumented manikin to similar dynamic motion (e.g., walking or running) The guiding rails 114 keep the legs of the instrumented manikin 102 aligned with the desired motion.

Figure 2:
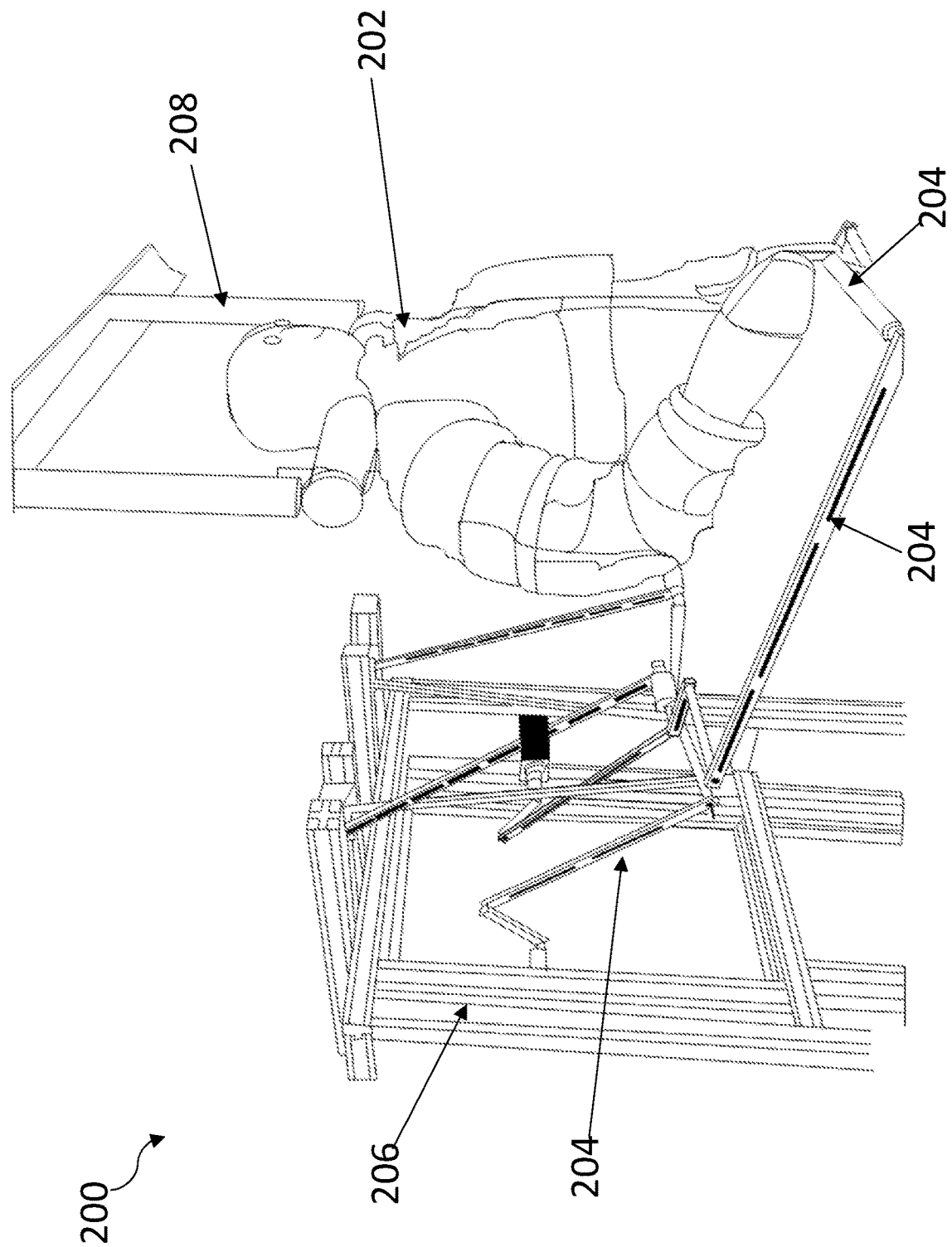
FIG. 2 illustrates a side perspective view of an upper portion of a flash fire instrumented manikin system according to one embodiment of the present invention.

FIG. 2 illustrates a side perspective view of an upper portion of a flash fire instrumented manikin test system 200 according to one embodiment of the present invention. The flash fire instrumented manikin test system 200 includes an instrumented manikin 202, an articulation system 204, a support frame 206, and a ceiling mount 208. The instrumented manikin 202 is connected to the support frame 206 via the articulation system 204. The instrumented manikin is further attached to the ceiling via the ceiling mount 208. The articulation system 204 includes a plurality of articulation components. For example, and not limitation, the plurality of articulation components includes a rod linkage system. For further example, and not limitation, the rod linkage system includes a plurality of rods and a plurality of couplers. The articulation system is connected to the hands of the instrumented manikin and is designed to simulate the arm movement corresponding to a dynamic motion (e.g., running or walking).

Figure 3:
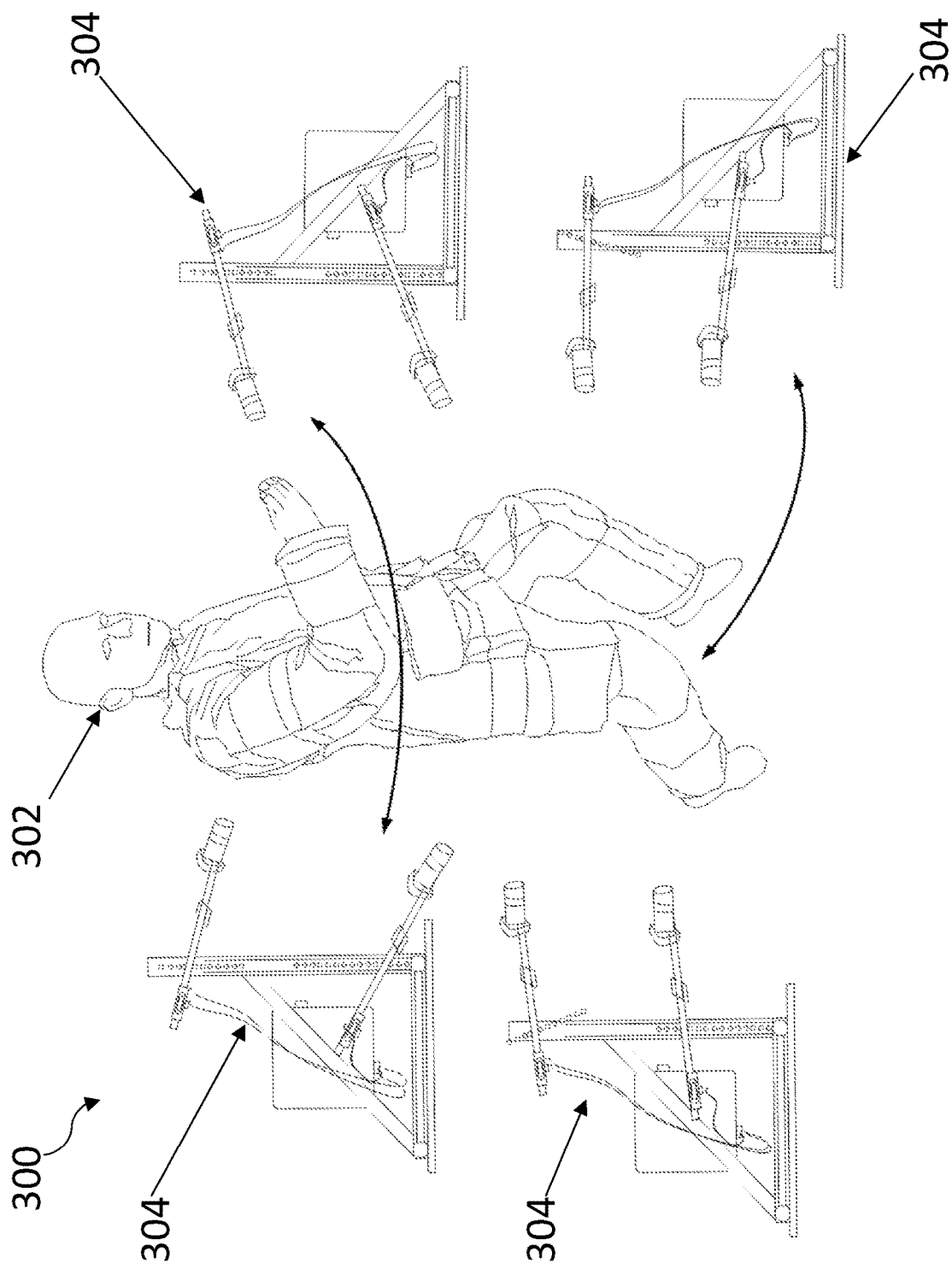
FIG. 3 is an illustration of a flash fire instrumented manikin system according to one embodiment of the present invention.

In one embodiment, as shown in FIG. 3, the present invention includes a flash fire instrumented manikin test system 300 comprising an instrumented manikin 302, an articulation system, a flame generation system 304, a data acquisition component, and at least one sensor. Each component of the flash fire instrumented manikin test system includes at least one layer of flame-resistant and/or fireproof material and/or a flame resistant and/or fireproof coating. The articulation system, the flame generation system, the data acquisition component, and the at least one sensor are operable for network communication.

Figure 4:
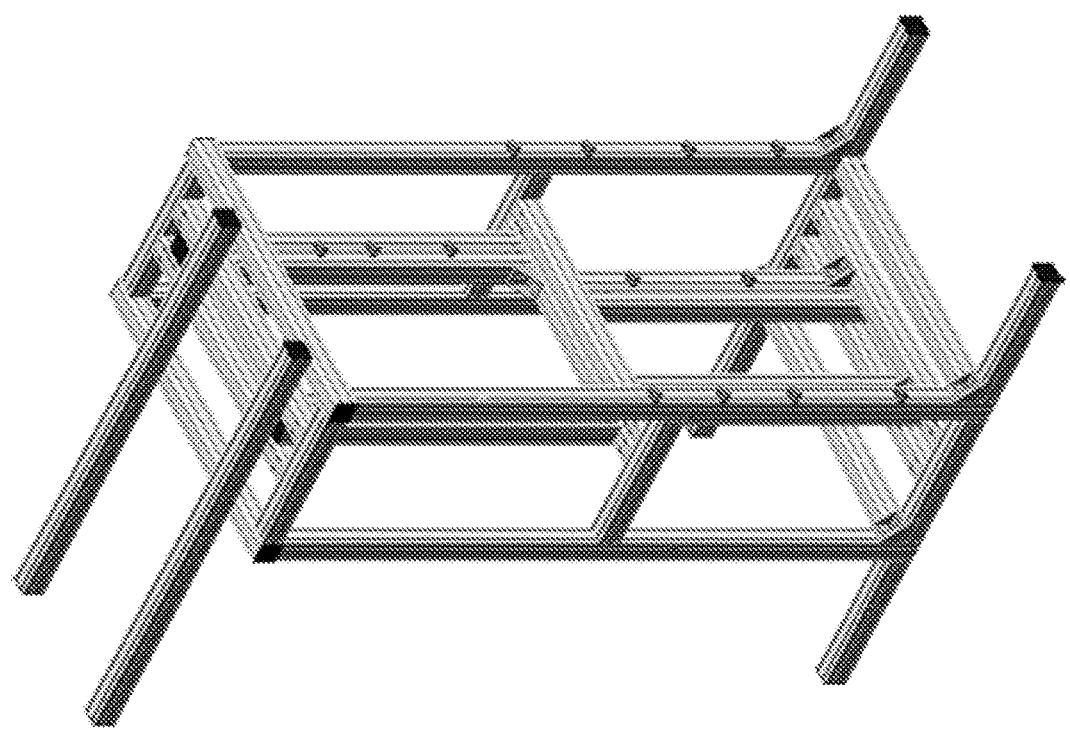
FIG. 4 is a rear perspective of a support stand for a flash fire instrumented manikin system according to one embodiment of the present invention.
Figure 5:
FIG. 5 is a front perspective of a support stand for a flash fire instrumented manikin system according to one embodiment of the present invention.
Figure 6:
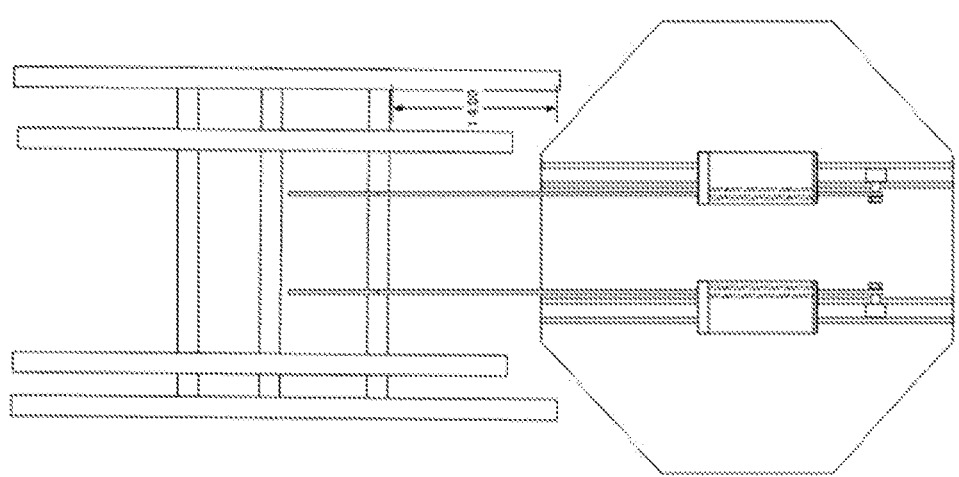
FIG. 6 is a bottom view of a support platform for a flash fire instrumented manikin system according to one embodiment of the present invention.
Figure 7:
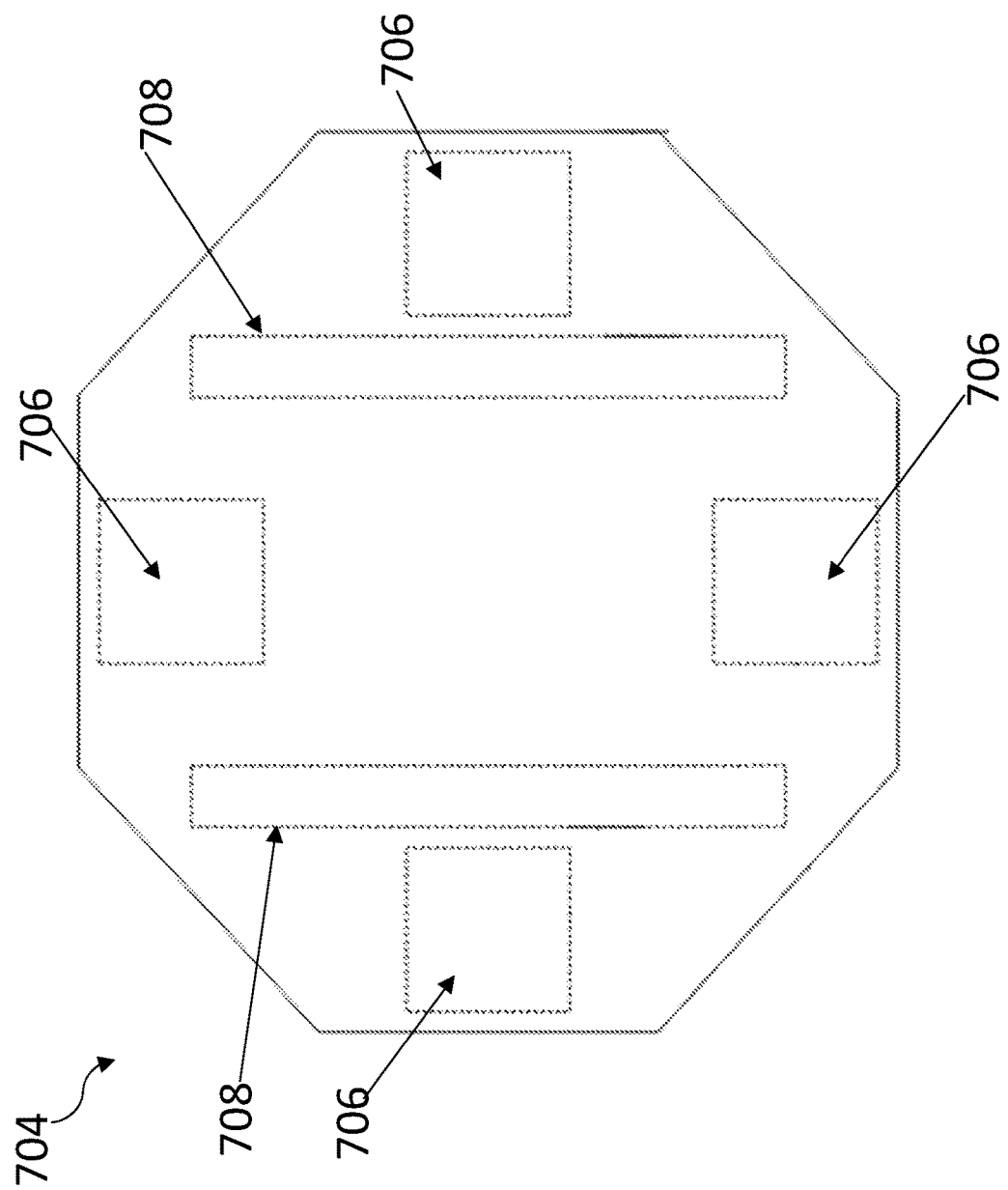
FIG. 7 is a top view of a support platform for a flash fire instrumented manikin system according to one embodiment of the present invention.

As shown in FIGS. 4 and 5, in one embodiment, the flash fire instrumented manikin test system includes a support stand (e.g., 402 and 502). The support stand is designed to receive the instrumented manikin. In another embodiment, as shown in FIGS. 6 and 7, the flashfire instrumented manikin system includes a support platform 604. The support platform 604 is positioned at the base of the manikin. In one embodiment, the platform includes a plurality of support legs, a plurality of wheel guides 704, and at least one stand lifter 706. In another embodiment, the stand lifter includes a scissor lifting jack platform. For example, and not limitation, the support platform is designed to receive at least one foot of an instrumented manikin via a foot platform. The foot platform is connected to and movable along a guiding rail.

Figure 8A:
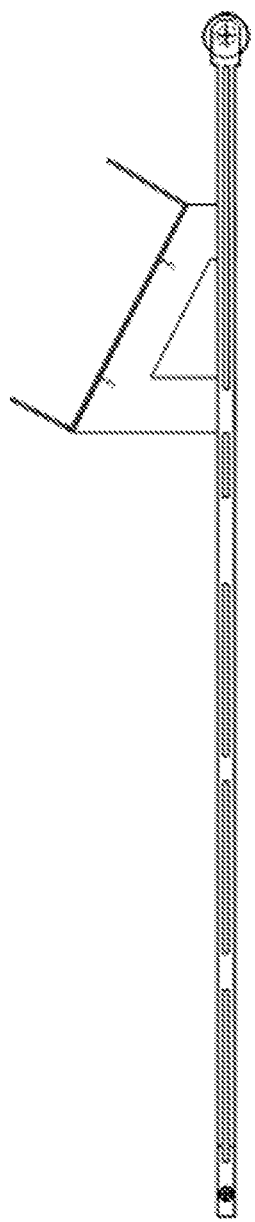
FIG. 8A illustrates a side view of a leg support of a flash fire instrumented manikin system according to one embodiment of the present invention.
Figure 8B:
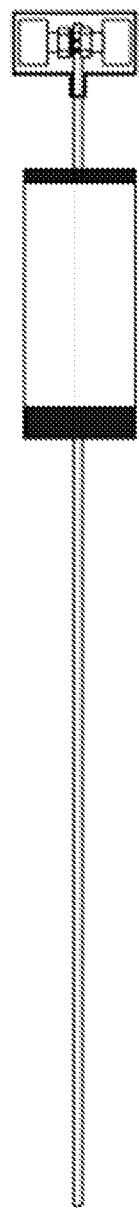
FIG. 8B illustrates a top view of a leg support of a flash fire instrumented manikin system according to one embodiment of the present invention.
Figure 9C:
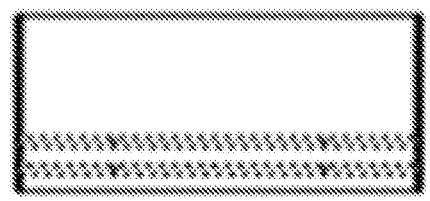
FIG. 9C illustrates a top view of a foot platform assembly of a flash fire instrumented manikin system according to one embodiment of the present invention.
Figure 9B:
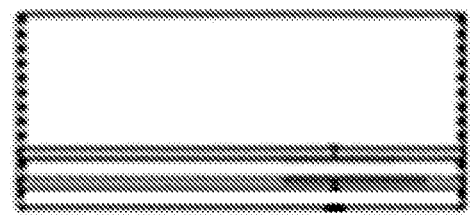
FIG. 9B illustrates a bottom view of a foot platform assembly of a flash fire instrumented manikin system according to one embodiment of the present invention.
Figure 9A:
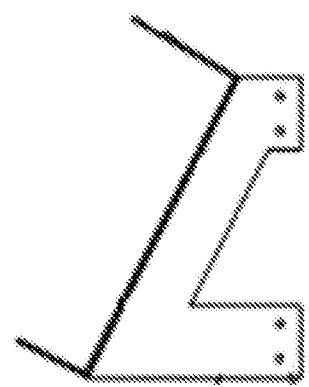
FIG. 9A illustrates a side view of a foot platform assembly of a flash fire instrumented manikin system according to one embodiment of the present invention.
Figure 10:
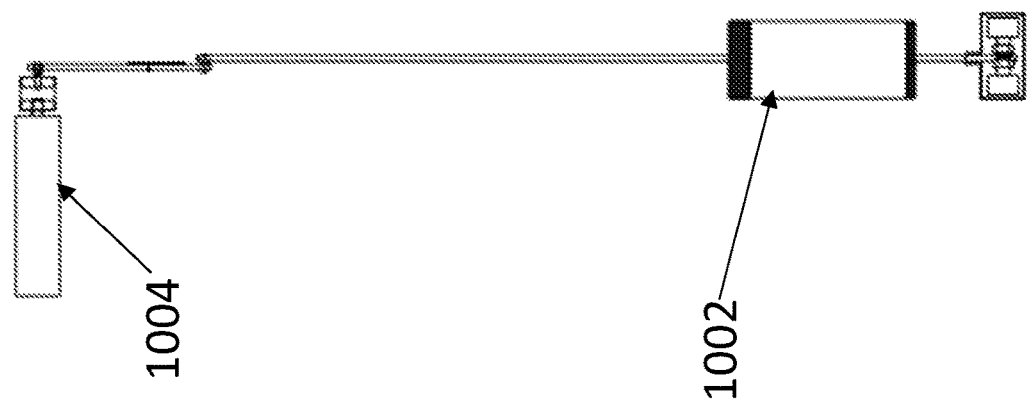
FIG. 10 illustrates a leg support system of a flash fire instrumented manikin system according to one embodiment of the present invention.

FIG. 8A illustrates a side view of a leg support of a flash fire instrumented manikin system according to one embodiment of the present invention. FIG. 8B illustrates a top view of a leg support of a flash fire instrumented manikin system according to one embodiment of the present invention. FIG. 9A illustrates a side view of a foot platform assembly of a flash fire instrumented manikin system according to one embodiment of the present invention. FIG. 9B illustrates a bottom view of a foot platform assembly of a flash fire instrumented manikin system according to one embodiment of the present invention. FIG. 9C illustrates a top view of a foot platform assembly of a flash fire instrumented manikin system according to one embodiment of the present invention. FIG. 10 illustrates a leg support system of an instrumented manikin of a flash fire system according to one embodiment of the present invention. The leg support system 1002 is attached to a control electronics 1004 including servo motor and a gearbox.

In one embodiment, the present invention includes an instrumented manikin comprising a plurality of limbs. For example, and not limitation, the manikin is adult-sized (e.g., between about 160 centimeters to about 175 centimeters). The instrumented manikin includes at least one layer of heat-resistant material. In one embodiment, the heat-resistant material is operable to withstand repeated exposure to simulated fires that exceed 1000 degrees Celsius and a flame exposure greater than twenty seconds. For example, and not limitation, the heat-resistant material includes aramid, lyocell, modacrylic, carbon fibers, and combinations thereof. The heat-resistant material used in the manikin construction is designed to not burn or otherwise contribute fuel to the combustion process. In yet another embodiment, the instrumented manikin includes a head, a neck, a chest, a back, an abdomen, buttocks, arms, hands, legs, and feet. The instrumented manikin further includes at least one sensor. In one embodiment, the instrumented manikin includes at least 100 sensors. In another embodiment, the instrumented manikin includes at least 105 sensors. In one embodiment, the at least one sensor includes a thermal energy sensor. In yet another embodiment, the instrumented manikin includes a plurality of sensors uniformly distributed over the surface of the instrumented manikin. The plurality of sensors covers all parts of the instrumented manikin. The instrumented manikin further includes joints designed to simulate the pumping action of a human walking or running while engulfed by flames. In another embodiment, the joints comprise a metal. In yet another embodiment, the instrumented manikin includes a metal joint positioned at the shoulders, elbows, hips, knees, and/or ankles. The instrumented manikin further includes thermocouple wiring designed to send the data captured by the at least one sensor to the data acquisition component.

Each limb of the plurality of limbs is attached to the articulation system. The articulation system is designed to separately control and drive each limb of the plurality of limbs to simulate dynamic movement (e.g., walking or running) The articulation system includes at least one electric motor and at least one controller designed to move the plurality of limbs of the instrumented manikin relative to a base for a controlled duration before, during, and/or after the propagation of flames. For example, and not limitation, in one embodiment, the at least one electric motor includes a servo motor. In another embodiment, the articulation system is connected to the instrumented manikin via a plurality of rods. For example, and not limitation, at least one rod is connected to at least one limb of the manikin via a collar clamp ball bearing. The articulation system is designed to control and provide dynamic motion, stiffness, weight reduction, and durability during the flash fire. The articulation system includes a rod linkage system comprising at least one coupler and a plurality of rods. For further example, and not limitation, the articulation system is connected to the arms of the instrumented manikin using at least one heat-resistant metal rod attached to the top of the hands. In yet another example, the articulation system is connected to at least one foot of the manikin via heat-resistant metal rods. Alternatively, or additionally, the plurality of rods includes at least one rod connected to a joint that is connected to at least two limbs of the instrumented manikin Advantageously, each limb of the plurality of limbs is operable to be separately controlled by the articulation system to simulate realistic walking and running motions.

Figure 11:
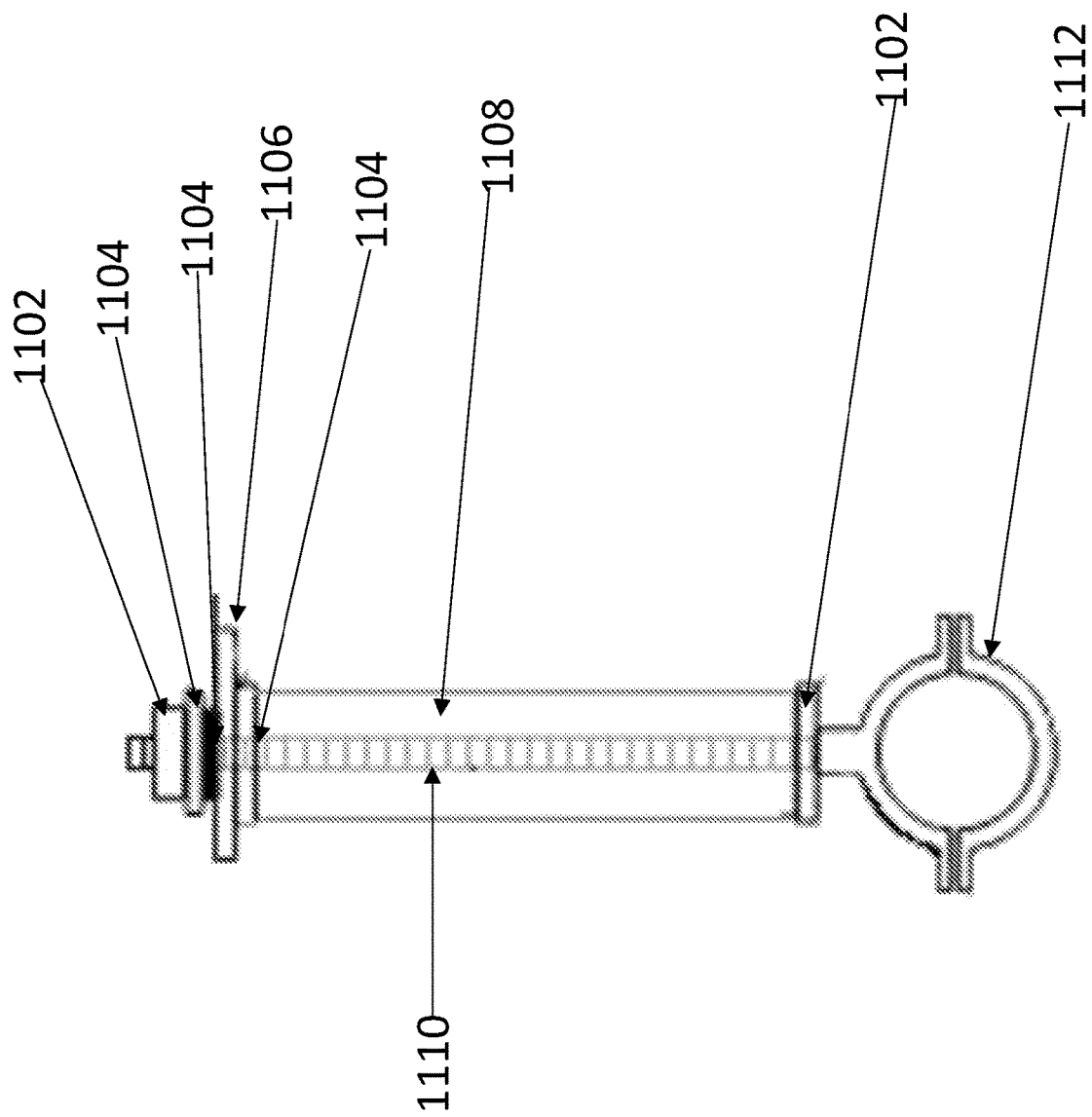
FIG. 11 illustrates an attachment mechanism of a flash fire instrumented manikin system according to one embodiment of the present invention.
Figure 12A:
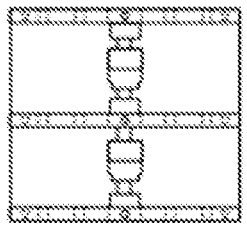
FIG. 12A illustrates a top view of a bearing assembly of an arm of an instrumented manikin according to one embodiment of the present invention.
Figure 12B:
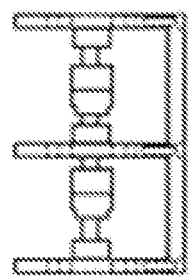
FIG. 12B illustrates a side view of an arm of an instrumented manikin according to one embodiment of the present invention.

In one embodiment, the rods are attached to the manikin via an angle iron mount. For example, and not limitation, the present invention includes an angle iron mount as shown in FIG. 11. The angle iron mount 1100 includes a nut 1102, a plurality of washers 1104, an angle iron 1106, tubing 1108, a threaded rod 1110, and a rod-mount clamp holder 1112. For further example, and not limitation, in some embodiments, the nut 1102 includes a ½"-13 thread nut. In some embodiments, the plurality of washers 1104 includes metal washers. In some other embodiments, at least one washer of the plurality of washers 1104 is a lock washer. For further example, and not limitation, the tubing 1008 includes a 0.12" wall thickness and stainless steel. The threaded rod includes stainless steel and a ½"-13 thread size. The rod-mount clamp holder includes a 2⅞" diameter. FIG. 12A illustrates a top view bearing assembly of an arm of an instrumented manikin according to one embodiment of the present invention. FIG. 12B illustrates a side view of an arm of an instrumented manikin according to one embodiment of the present invention.

The flame generation component is designed to apply heat and flames to the instrumented manikin. In one embodiment, the flame generation component includes a propane torch designed to produce propane-air diffusion flames. The flame generation component is configured to control the impingement of heat and flames onto the instrumented manikin. In another embodiment, the flame generation component includes a plurality of flame generating devices. The plurality of flame generating devices is positioned around the instrumented manikin to enable control of the intensity and spatial distribution of heat flux engulfing the manikin. In another embodiment, the flame generation component is designed to engulf the instrumented manikin with a simulated flash fire for at least twenty seconds and an average of 84 kW/m². In yet another embodiment, the flame generation component includes at least eight propane burners. In one embodiment, the at least eight propane burners are uniformly spaced around the instrumented manikin. In yet another embodiment, the flame generation component is designed to generate a diffuse fuel into the environment and a moving flame front for a predetermined time period. In one embodiment, the predetermined time period is at least a three second duration. In another embodiment, each flame generation component is movably in a horizontal direction and/or a vertical direction.

The data acquisition component of the present invention is designed to receive data from one or more sensors attached to the instrumented manikin. The data acquisition component is operable to analyze the received sensor data to determine the temperature and heat flux experienced by the clothing positioned on the instrumented manikin. The data acquisition component is further operable to determine an injury level corresponding to the amount of heat (e.g., second-degree burn). In another embodiment, the data acquisition component is configured to receive positioning data from the plurality of sensors and the at least one electric motor and controller. The data acquisition component is further operable to analyze the positioning data to determine the movement of the manikin. In one embodiment, the data acquisition component is designed to receive at least five samples per second during a testing period. In another embodiment, the data acquisition component is configured to receive at least one sample per second. In yet another embodiment, the data acquisition component is configured to receive at least ten samples per second.

The data acquisition component further includes at least one algorithm designed to predict skin burn. In one embodiment, the at least one algorithm includes a predicted skin burn model. The predicted skin burn model includes calculating an internal temperature field at each sensor by analyzing the heat flux values. The predicted skin burn model is operable to determine the temperature value at the surface, at an epidermis/dermis level (to predict second-degree burn injuries), and at a dermis/subcutaneous level (to predict a third-degree burn injury). The data acquisition component is further configured to determine a level of total predicted body burn. The data acquisition component generates an alert when the level of total predicted body burn exceeds a threshold. For example, and not limitation, the threshold includes a predicted body burn of 50%. In another embodiment, the data acquisition component generates an alert indicating whether the instrumented manikin simulated dynamic movement. Advantageously, the at least one algorithm is operable to determine whether the testing parameters of a desired testing standard (e.g., ASTM F1930) were met and to generate an alert and/or recommendation corresponding to whether the testing parameters were met. For example, and not limitation, the data acquisition component is operable to determine whether the flame generation component created a desired temperature (e.g., at least 100 degrees Celsius). If the desired temperature was not met, then the data acquisition component is operable to generate an alert to a remote device to indicate that the test should be performed again, that the flame generation component needs to be replaced, and/or other recommendations corresponding to the flash fire instrumented manikin test system.

In another embodiment, the data acquisition component further includes at least one image acquisition device, the at least one image acquisition device is operable to capture visual data of the clothing before, during, and after the propagation of the flames. The data acquisition component is operable to analyze the image data to determine dye sublimation, dye carbonization, vertical shrinking, and radial shrinkage. The data acquisition component is further operable to determine after flame time and thermal shrinkage. For example, and not limitation, in one embodiment, the data acquisition component includes a plurality of thermocouple data loggers and video capturing devices.

In one embodiment, the at least one sensor includes a thermal energy sensor. The thermal energy sensor is designed to measure heat flux over a range between about zero to about 164 kW/m². In another embodiment, at least one sensor includes an accelerometer, an inertial measurement unit, and/or a temperature sensor. The accelerometer and the inertial measurement unit are designed to capture the position and changes in position of the instrumented manikin Advantageously, the positioning data enables the present invention to confirm that the instrumented manikin simulated dynamic movement during the flash fire simulation.

The present invention is designed to meet the standards corresponding to the ASTM F1930 Test and/or the International Organization for Standardization (ISO) 13506-1:2017 for Protective clothing against heat and flame Part 1: Test method for complete garments—Measurement of transferred energy using an instrumented manikin and ISO 13506-2:207 for Protective clothing against heat and flame—Part 2: Skin burn injury prediction—Calculation requirements and test cases. The ASTM F1930 Test, ISO 13506-1:207 test, and ISO 13506-2:207 test are each incorporated herein by reference in their entirety.

Figure 13:
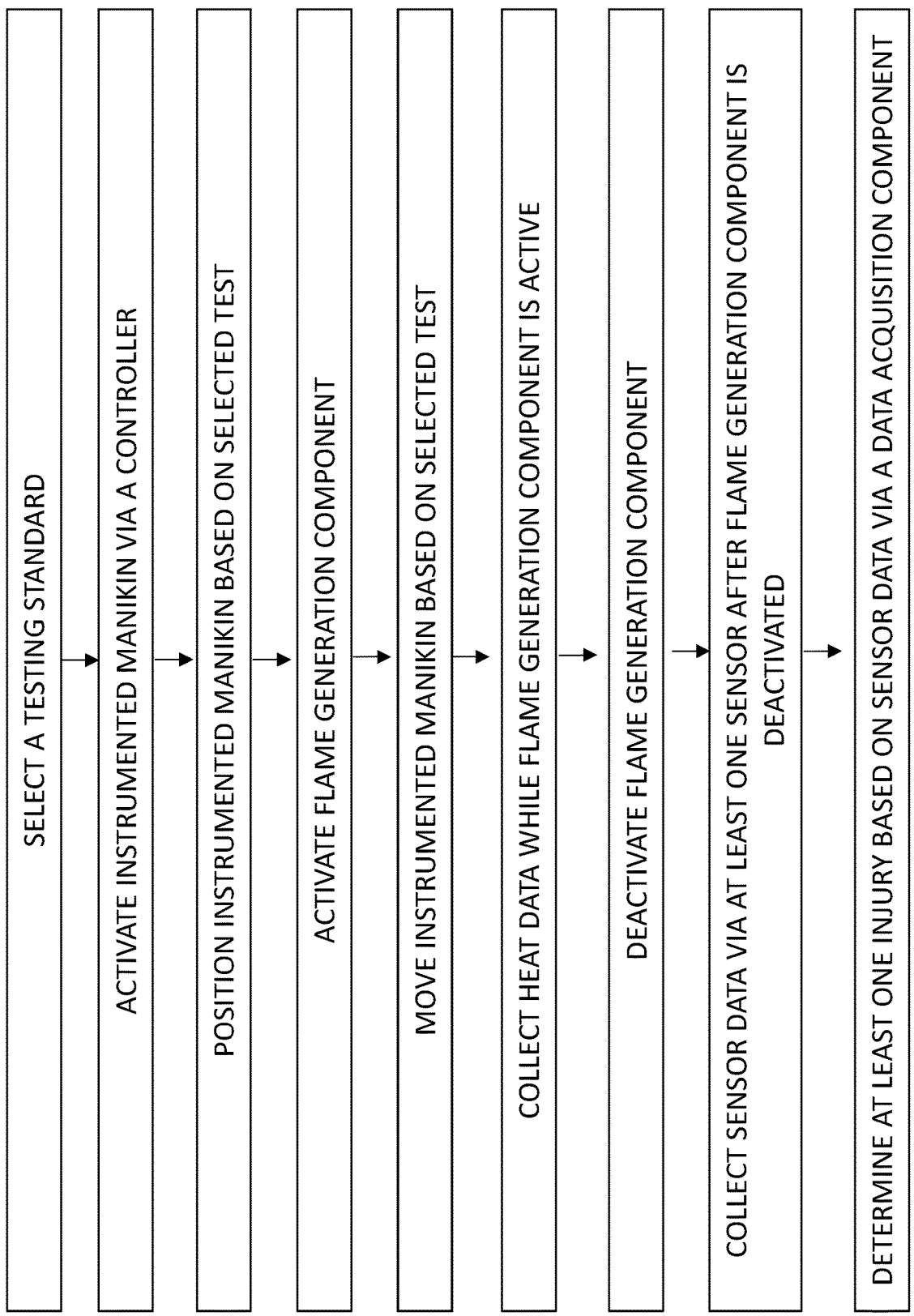
FIG. 13 illustrates a method of testing a flame-resistant material using a flash fire instrumented manikin system according to one embodiment of the present invention.

In another embodiment, the present invention includes a method of flash-fire testing an instrumented manikin. For example, and not limitation, as shown in FIG. 13, a desired testing standard (e.g., ASTM F1930 Test) is selected. Then, at least one limb of an instrumented manikin is activated via a controller based on the selected testing standard. Next, at least one flame generation component is activated via the controller. The flame generation component activation corresponds to the selected testing standard. At least one sensor collects heat data that corresponds to the flame generation component and the instrumented manikin. Then the sensor transmits the heat data to at least one data acquisition component. The data acquisition component determines the effect of the heat from the flame generation device on the manikin. The at least one effect includes a first-degree burn, a second-degree burn, and/or a third-degree burn.

Figure 14:
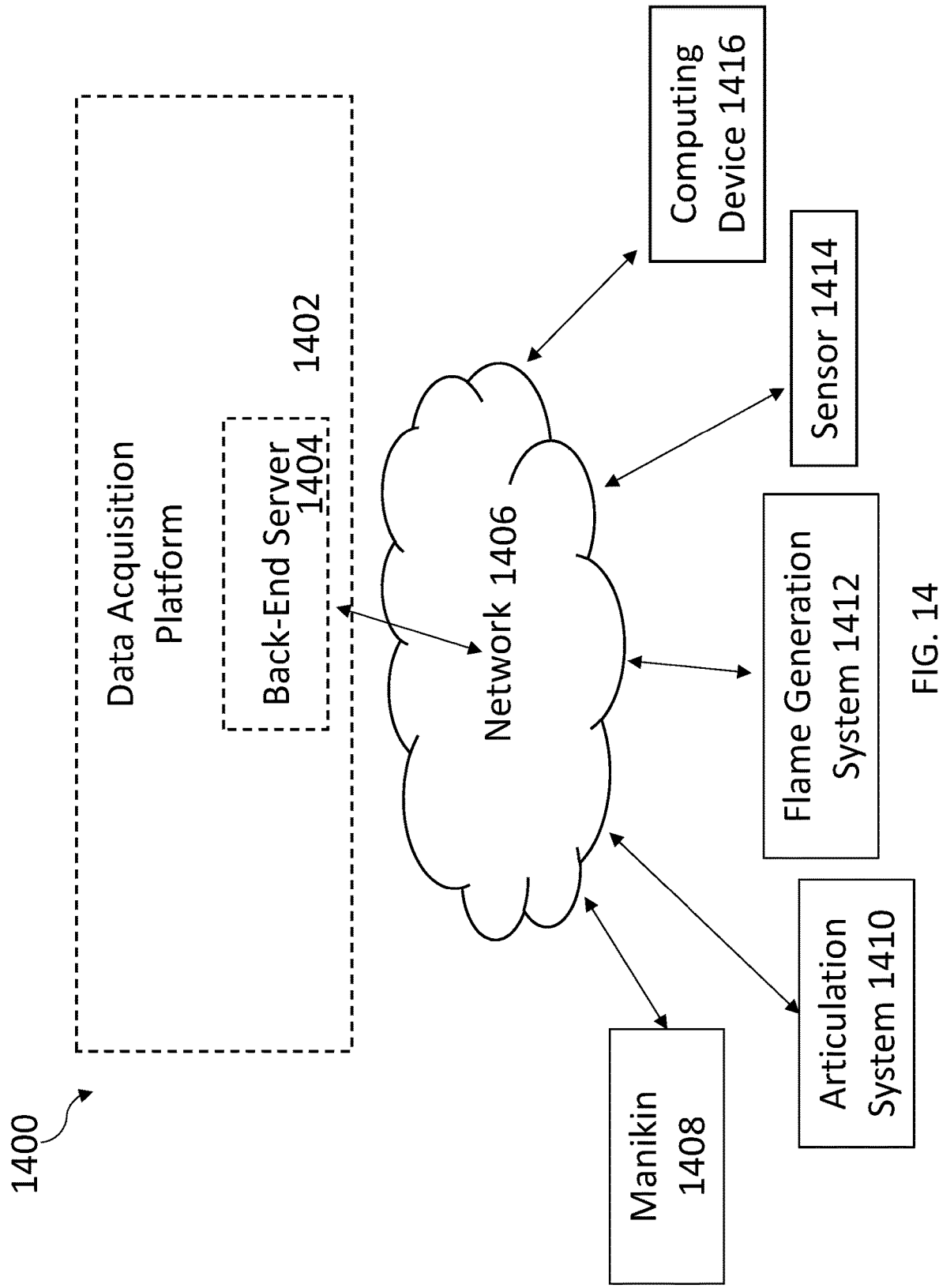
FIG. 14 illustrates a schematic diagram of a flash fire instrumented manikin system according to one embodiment of the present invention.

FIG. 14 depicts an exemplary system implementing the methods and systems for a flash fire manikin articulation system.

The system 1400 includes a data acquisition platform 1402 hosted on one or more back-end servers 1404. The back-end server 1404 may communicate with a plurality of computing devices 1416. The computing devices may be smart tablets, laptops, workstations, PCs, or the like. The computing devices may communicate with the back-end server 1404 over a network 1406. The network 1406 may be any type or combination of wired, wireless, and/or optical networks. The data acquisition platform 1402 may be communicatively coupled to the instrumented manikin 1408. The data acquisition platform may be communicatively coupled to the articulation system 1410. The data acquisition platform 1402 may be communicatively coupled to flame generation system 1412. The data acquisition platform 1402 may be communicatively coupled to at least one sensor 1414. In a preferred embodiment, the network is the Internet. In other embodiments, the network may be restricted to a private local area network (LAN) and/or private wide area network (WAN). The network provides connectivity with a plurality of client devices including a personal computer hosting a client application, and a mobile device hosting a mobile app. The network also provides connectivity for an Internet-Of-Things (IoT) device hosting an IoT application and to back-end services.

Figure 15:
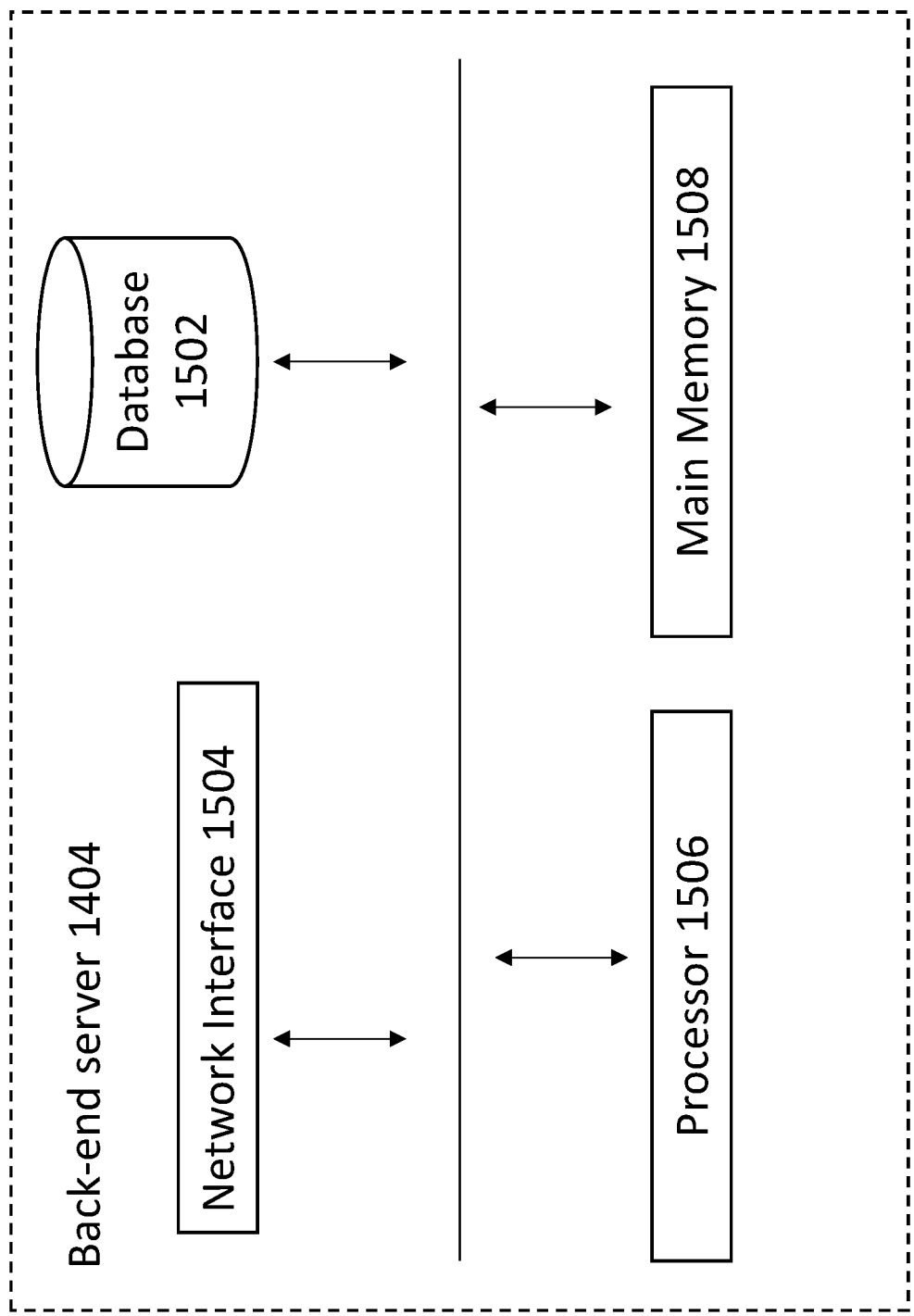
FIG. 15 is a block diagram of a server of a flash fire instrumented manikin system according to one embodiment of the present invention.

FIG. 15 illustrates an exemplary block diagram of one embodiment of the back-end server of FIG. 14.

The back-end server 1404 may include at least one processor 1506, a main memory 1508, a database 1502, and a network interface 1504. The processor 1506 may be a multi-core server class processor suitable for hardware virtualization. The processor may support at least a 64-bit architecture and a single instruction multiple data (SIMD) instruction set. The main memory 1508 may include a combination of volatile memory (e.g., random-access memory) and non-volatile memory (e.g., flash memory). The database 1502 may include one or more hard drives. The network interface 1504 may provide one or more high-speed communication ports to the data center switches, routers, and/or network storage appliances. The network interface 1504 may include high-speed optical Ethernet, InfiniBand (IB), Internet Small Computer System Interface (iSCSI), and/or Fibre Channel interfaces.

Figure 16:
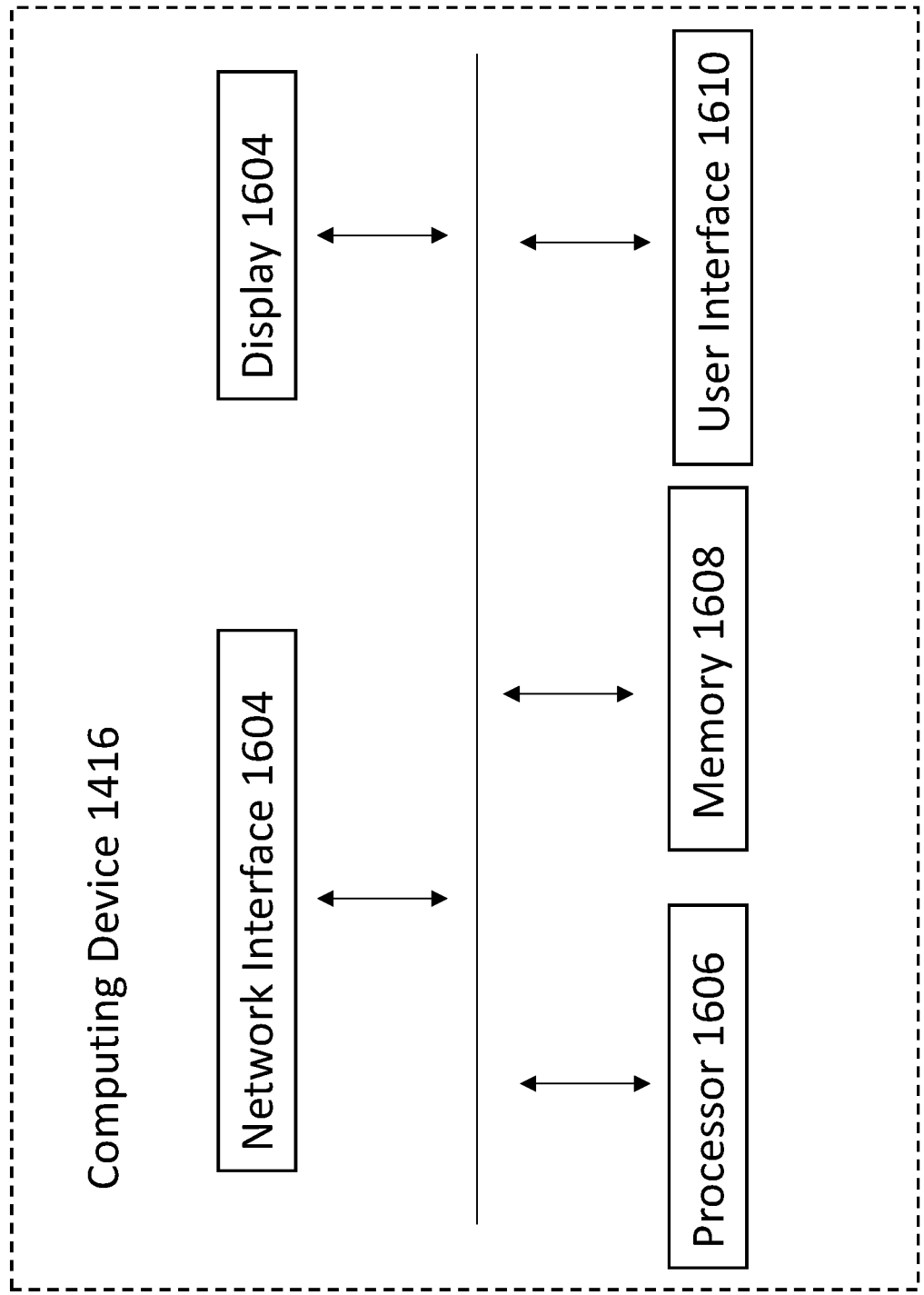
FIG. 16 is a block diagram of a computing device of a flash fire instrumented manikin system according to one embodiment of the present invention.

FIG. 16 depicts a block diagram illustrating one embodiment of a computing device shown in FIG. 14.

The computing device 1416 may include at least one processor 1606, a memory 1608, a network interface 1602, a display 1604, and a user interface (UI) 1610. The memory 1608 may be partially integrated with the processor 1606. The UI 1610 may include a keyboard, a mouse, and/or a stylus. The display 1604 and the UI 1610 may provide any of the GUIs in the embodiments of this disclosure. The computing device includes circuitry. The circuitry can be any of various commercially available processors, including without limitation an AMD® processor, an IBM, an Intel® processor, or other similar processors. Dual microprocessors, multi-core processors, and other multi-processor architectures may also be employed as circuitry.

The system disclosed herein may be implemented as a client/server type architecture but may also be implemented using other architectures, such as cloud computing, software as a service model (SaaS), a mainframe/terminal model, a stand-alone computer model, a plurality of non-transitory lines of code on a computer-readable medium that can be loaded onto a computer system, a plurality of non-transitory lines of code downloadable to a computer and the like which are within the scope of the disclosure.

The system may be implemented with one or more computing devices that connect to, communicate with and/or exchange data over a link that interact with each other. Each computing device may be a processing unit-based device with sufficient processing power, memory/storage, and connectivity/communications capabilities to connect to and interact with the system. For example, each computing device may be an Apple iPhone or iPad product, a Blackberry or Nokia product, a mobile product that executes the Android operating system, a personal computer, a tablet computer, a laptop computer, and the like and the system is not limited to operate with any particular computing device. The link may be any wired or wireless communications link that allows the one or more computing devices and the system to communicate with each other. In one example, the link may be a combination of wireless digital data networks that connect to the computing devices and the Internet. The system may be implemented as one or more server computers (all located at one geographic location or in disparate locations) that execute a plurality of lines of non-transitory computer code to implement the functions and operations of the system as described herein. Alternatively, the system may be implemented as a hardware unit in which the functions and operations of the back-end system are programmed into a hardware system. In one implementation, the one or more server computers may use Intel® processors, run the Linux operating system, and execute Java, Ruby, Regular Expression, Flex 4.0, SQL etc.

In some embodiments, each computing device may further comprise a display and a browser application so that the display can display information generated by the system (e.g., predicted burn injury). The browser application may be a plurality of non-transitory lines of computer code executed by a processing unit of the computing device. Each computing device may also have the usual components of a computing device such as one or more processing units, memory, permanent storage, wireless/wired communication circuitry, an operating system, etc.

When a user interacts with the system, the user may use a front-end client application. The client application may include a graphical user interface that allows the user to select one or more digital files and to control one or more of the articulation system, the flame generation component, or the instrumented manikin. The client application may communicate with a backend cloud component using an application programming interface (API) comprising a set of definitions and protocols for building and integrating application software. As used herein, an API is a connection between computers or between computer programs that is a type of software interface, offering a service to other pieces of software. A document or standard that describes how to build or use such a connection or interface is called an API specification. A computer system that meets this standard is said to implement or expose an API. The term API may refer either to the specification or to the implementation.

Cloud storage may store or manage information using a public or private cloud. Cloud storage is a model of computer data storage in which the digital data is stored in logical pools. The physical storage spans multiple servers (sometimes in multiple locations), and the physical environment is typically owned and managed by a hosting company. Cloud storage providers are responsible for keeping the data available and accessible, and the physical environment protected and running People and/or organizations buy or lease storage capacity from the providers to store user, organization, or application data. Cloud storage services may be accessed through a co-located cloud computing service, a web service API, or by applications that utilize the API.

Any combination of one or more computer-readable medium(s) may be utilized. The computer-readable medium may be a computer-readable signal medium or a computer-readable storage medium (including, but not limited to, non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the technology described herein may be written in any combination of one or more programming languages, including object-oriented and/or procedural programming languages. Programming languages may include, but are not limited to: Ruby®, JavaScript®, Java®, Python®, PHP, C, C++, C#, Objective-C®, Go®, Scala®, Swift®, Rodin®, OCaml®, or the like. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the technology described herein may be embodied as a system, method, or computer program product. Accordingly, aspects of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technology may take the form of a computer program product embodied in one or more computer-readable medium(s) having computer readable program code embodied thereon.

The corresponding structures, materials, acts, and equivalents of all means or step plus function elements in the claims below are intended to include any structure, material, or act for performing the function in combination with other claimed elements as specifically claimed. The description provided herein has been presented for purposes of illustration and description but is not intended to be exhaustive or limited to the specific form disclosed. Many modifications and variations will be apparent to those of ordinary skill in the art without departing from the scope and spirit of the disclosure. The embodiment was chosen and described in order to best explain the principles described herein and the practical application of those principles, and to enable others of ordinary skill in the art to understand the technology for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A dynamic motion instrumented manikin system for flash fire testing comprising:
    an instrumented manikin comprising a heat-resistant material and a plurality of limbs;
    an articulation system comprising a plurality of articulation components, at least one electric motor, and at least one controller;
    at least one flame generation component;
    at least one sensor; and
    at least one data acquisition component;

wherein the articulation system, the at least one flame generation component, the at least one sensor, and the at least one data acquisition component are in network communication; and wherein the articulation system is connected to the instrumented manikin via the plurality of articulation components; wherein the at least one electric motor is designed to drive the plurality of articulation components to move the instrumented manikin to simulate at least one dynamic motion, wherein the at least one dynamic motion includes walking or running.

2. The system of claim 1, wherein the plurality of limbs includes at least one joint, wherein at least one articulation component of the plurality of articulation components is connected to the at least one joint.

3. The system of claim 1, wherein the at least one controller is operable to control the at least one electric motor and the plurality of articulation components, wherein, the at least one controller is further operable to control a position of the plurality of limbs for a predetermined time period using the at least one electric motor and the plurality of articulation components, wherein the predetermined time period includes a time before activation of the at least one flame generation component, a time during activation of the at least one flame generation component, and a time after activation of the at least one flame generation component.

4. The system of claim 1, wherein each limb of the plurality of limbs is separately controllable via the at least one controller.

5. The system of claim 1, wherein the at least one flame generation component further includes at least one propane component, wherein the at least one flame generation component is further operable to control a flame intensity and a spatial distribution of heat flux engulfing the instrumented manikin.

6. The system of claim 1, wherein the at least one flame generation component is operable to control a flame intensity and spatial distribution of heat flux for at least ten seconds.

7. The system of claim 1, wherein the at least one flame generation component includes at least eight propane components and is configured to generate a flash fire with an average heat flux of about 84 kw/m$^2$.

8. The system of claim 1, wherein the plurality of articulation components is attached to the instrumented manikin via a plurality of angle iron mounts.

9. The system of claim 1, wherein the at least one sensor is attached to the instrumented manikin, wherein the at least one sensor is operable to capture temperature data corresponding to the heat generated by the at least one flame generation component.

10. The system of claim 1, wherein the at least one flame generation component is designed to simulate a flash fire, wherein the at least one sensor further includes a plurality of sensors, wherein at least one sensor of the plurality of sensors is a temperature sensor designed to capture temperature data related to the heat generated by the at least one flame generation component, wherein at least one other sensor includes a movement sensor, wherein the movement sensor is designed to monitor a movement of the instrumented manikin while undergoing the flash fire.

11. The system of claim 10, wherein the movement sensor includes an accelerometer or an inertial measurement unit, wherein the movement sensor is operable to monitor a position and a change of position of the instrumented manikin.

12. The system of claim 9, wherein the at least one sensor is operable to transmit the temperature data to the at least one data acquisition component, wherein the at least one data acquisition component is operable to determine a temperature and heat flux experienced by the instrumented manikin.

13. The system of claim 12, wherein the at least one data acquisition component is further operable to determine at least one injury based on the temperature and heat flux experienced by the instrumented manikin, wherein the at least one injury includes a first-degree burn, a second-degree burn, and/or a third-degree burn, wherein the at least one data acquisition component further determines a percentage of body burned.

14. The system of claim 12, wherein the data acquisition component includes a predicted skin burn model to determine a temperature value at an external surface of the instrumented manikin, wherein the predicted skin burn model further estimates the temperature value at an epidermis level and/or an subcutaneous level.

15. The system of claim 1, wherein the at least one sensor is operable to measure heat flux from about zero to about 164 kW/m$^2$.

16. A dynamic motion flash fire instrumented manikin test system for simulation of a flash fire comprising:
    an instrumented manikin comprising a heat-resistant material and a plurality of limbs;
    an articulation system comprising a plurality of articulating rods, at least one electric motor, and at least one controller;
    at least one flame generation component designed to generate a flash fire;
    at least one data acquisition component; and
    at least one sensor;
    wherein the instrumented manikin is operable to simulate dynamic movement, wherein the dynamic movement includes a pumping action of walking or running;
    wherein the plurality of limbs is connected to the articulation system via the plurality of articulating rods, wherein the at least one electric motor is operable to drive the plurality of articulating rods to simulate the dynamic movement;
    wherein the at least one controller is operable to move the plurality of limbs for a predetermined time period, wherein the predetermined time period includes a time before activation of the at least one flame generation component, a time during activation of the at least one flame generation component, and a time after activation of the at least one flame generation component; and
    wherein the at least one sensor is operable to capture heat data, wherein the heat data includes temperature, heat flux, and heat distribution generated by the at least one flame generation component; wherein the heat data further includes temperature, heat flux, and heat distribution near the instrumented manikin, wherein the heat data further includes temperature, heat flux, and heat distribution on an external surface of the instrumented manikin, wherein the at least one sensor is in network communication with the at least one data acquisition component, wherein the at least one data acquisition component is designed to receive the heat data from the at least one sensor, wherein the at least one data acquisition component is operable to determine at least one effect of the heat generated by the at least one flame generation component on the instrumented manikin.

17. The system of claim 16, wherein the at least one flame generation component is operable to control a flame intensity and spatial distribution of heat flux around the instrumented manikin.

18. The system of claim 16, wherein the at least one sensor includes a thermal energy sensor, wherein the thermal energy sensor measures heat flux between about zero to about 164 kW/m$^2$.

19. The system of claim 16, wherein the at least one flame generation component includes at least eight propane components.

20. A method of performing flash fire testing on an instrumented manikin system comprising:
- selecting a testing standard, wherein the testing standard includes a heat flux requirement, a flame distribution requirement, and a flame duration requirement;
- positioning, via an articulation system, at least two limbs of a plurality of limbs of an instrumented manikin based on the selected testing standard, wherein the articulation system comprises a plurality of articulation components, at least one electric motor, and at least one controller;
- activating at least one flame generation component based on the selected testing standard;
- moving, via the articulation system, the instrumented manikin in a dynamic motion for at least the flame duration requirement, wherein the dynamic motion includes walking or running;
- collecting, via at least one sensor, heat data corresponding to the at least one flame generation component and the instrumented manikin, wherein the heat data includes temperature and heat flux;
- deactivating the at least one flame generation component based on the selected testing standard;
- collecting, via the at least one sensor, heat data corresponding to an external surface of the instrumented manikin after the deactivation of the at least one flame generation component; and
- determining, via at least one data acquisition component, a burn level based on the heat data after the activation of the at least one flame generation component and the heat data after the deactivation of the at least one flame generation component, wherein the burn level includes a first-degree burn, a second-degree burn, and/or a third-degree burn.

* * * * *